US009122655B2

(12) United States Patent
Schultz et al.

(10) Patent No.: US 9,122,655 B2
(45) Date of Patent: Sep. 1, 2015

(54) PRE-TRANSLATION TESTING OF BI-DIRECTIONAL LANGUAGE DISPLAY

(75) Inventors: Dale M. Schultz, Middlesex, MA (US); Roy Hudson, Billerica, MA (US)

(73) Assignee: International Business Machines Corporation, Armonk, NY (US)

(*) Notice: Subject to any disclaimer, the term of this patent is extended or adjusted under 35 U.S.C. 154(b) by 1054 days.

(21) Appl. No.: 10/989,014

(22) Filed: Nov. 15, 2004

(65) Prior Publication Data

US 2006/0106593 A1    May 18, 2006

(51) Int. Cl.
*G06F 17/28* (2006.01)
*G06F 17/20* (2006.01)
*G06F 17/21* (2006.01)

(52) U.S. Cl.
CPC .................... *G06F 17/212* (2013.01)

(58) Field of Classification Search
CPC ... G06F 17/28; G06F 17/2854; G06F 9/4448; G06F 17/275; G06F 17/2863; G06F 17/2223; G06F 17/278; G06F 17/21; G06F 17/211; G06F 17/2217; G06F 17/2872; G09B 19/06
USPC .......................................... 704/2, 3, 8, 4, 5, 7
See application file for complete search history.

(56) References Cited

U.S. PATENT DOCUMENTS

| | | | |
|---|---|---|---|
| 5,091,950 A * | 2/1992 | Ahmed | 704/277 |
| 5,412,771 A * | 5/1995 | Fenwick | 345/468 |
| 5,416,898 A | 5/1995 | Opstad et al. | |
| 5,572,668 A * | 11/1996 | See et al. | 714/38.1 |
| 5,682,158 A * | 10/1997 | Edberg et al. | 341/90 |
| 5,784,069 A * | 7/1998 | Daniels et al. | 345/467 |
| 5,784,071 A * | 7/1998 | Tang et al. | 345/467 |
| 5,903,861 A * | 5/1999 | Chan | 704/9 |
| 5,918,206 A * | 6/1999 | Wong et al. | 704/271 |
| 6,055,365 A | 4/2000 | Tye | |
| 6,157,905 A * | 12/2000 | Powell | 704/2 |
| 6,425,123 B1 | 7/2002 | Rojas et al. | |
| 6,445,458 B1 | 9/2002 | Focazio et al. | |
| 6,453,462 B1 | 9/2002 | Meade et al. | |
| 6,460,015 B1 * | 10/2002 | Hetherington et al. | 704/8 |

(Continued)

OTHER PUBLICATIONS

Arbabi et al., Algorrithms for Arabic Name Tansliteration, IBM J. Res. Develop. vol. 38 No. 2 Mar. 1994.*

(Continued)

*Primary Examiner* — Edgar Guerra-Erazo
(74) *Attorney, Agent, or Firm* — Steven M. Greenberg, Esq.; CRGO Law

(57) ABSTRACT

A method for testing the display of bi-directional language script prior to translation in an application under test can include using unidirectional glyphs with shaping indicators to simulate right-to-left characters. The using step can include reversing an ordering of a first set of unidirectional text characters in an input string and mapping the unidirectional text characters to right-to-left code points in a bi-directional language code page to produce a pseudo-translated string. Multiple unidirectional language glyphs can be loaded where each corresponds to a same one of the right-to-left character code points as had been used to produce the pseudo-translation. The pseudo-translation and the glyphs can be combined to simulate right-to-left character rendering in the application under test such the resultant output is visually similar to the input string. Finally, the glyphs can include character shaping indicia such that a resultant output allows for the detection of shaping errors.

8 Claims, 3 Drawing Sheets

(56) References Cited

U.S. PATENT DOCUMENTS

| | | | |
|---|---|---|---|
| 6,493,661 | B1 | 12/2002 | White, III et al. |
| 6,493,735 | B1 | 12/2002 | Kumhyr |
| 6,496,844 | B1 | 12/2002 | Hetherington et al. |
| 6,507,812 | B1 | 1/2003 | Meade et al. |
| 6,704,116 | B1 | 3/2004 | Abulhab |
| 6,771,267 | B1 * | 8/2004 | Muller ........................... 345/467 |
| 6,810,374 | B2 * | 10/2004 | Kang ................................ 704/2 |
| 6,944,820 | B2 * | 9/2005 | Feinberg ........................ 715/256 |
| 7,103,875 | B1 * | 9/2006 | Kaneko et al. ................ 717/125 |
| 7,111,011 | B2 * | 9/2006 | Kobayashi et al. .................... 1/1 |
| 7,636,083 | B2 * | 12/2009 | Aoki et al. ..................... 345/172 |
| 2002/0093683 | A1 | 7/2002 | Focazio et al. |
| 2003/0040909 | A1 * | 2/2003 | Ghali ............................ 704/235 |
| 2003/0074185 | A1 * | 4/2003 | Kang ................................ 704/2 |
| 2003/0182103 | A1 | 9/2003 | Atkin |
| 2003/0191626 | A1 * | 10/2003 | Al-Onaizan et al. .............. 704/8 |
| 2004/0039996 | A1 | 2/2004 | Flam |
| 2004/0167769 | A1 * | 8/2004 | Becker ............................... 704/3 |
| 2005/0065772 | A1 * | 3/2005 | Atkin et al. ....................... 704/2 |
| 2005/0188308 | A1 * | 8/2005 | Schultz ......................... 715/534 |
| 2005/0195171 | A1 * | 9/2005 | Aoki et al. ..................... 345/172 |
| 2005/0200913 | A1 * | 9/2005 | Hohensee et al. ............ 358/462 |
| 2005/0222838 | A1 * | 10/2005 | Gong ................................ 704/5 |
| 2006/0031239 | A1 * | 2/2006 | Koenig ......................... 707/100 |
| 2006/0079281 | A1 * | 4/2006 | Ravindra et al. .............. 455/558 |
| 2006/0112091 | A1 * | 5/2006 | Chapman et al. ................. 707/4 |
| 2006/0143207 | A1 * | 6/2006 | McQuaid et al. ............ 707/101 |

OTHER PUBLICATIONS

Al-Onaizan, Y. and Knight K., "Translating Named Entities Using Monolingual and Bilingual Resources," Proceedings of Conference of the Association for Computational Linguistics (ACL)-02. Philadelphia, 2002.*

Al-Onaizan, Y. and Knight K., "Machine Transliteration of Names in Arabic Text," Proceedings of ACL Workshop on Computational Aproaches to Semitic Languages. Philadelphia, 2002.*

Knight, K. and Yamada, K., "A Computational Approach to Deciphering Unknown Scripts," Proceedings of the ACL Workshop on Unsupervised Learning in Natural Language Processing, 1999.*

Stalls, B. and Knight, K., "Translating Names and Technical Terms in Arabic Text," Proceedings of the Coling/ACL Workshoo on Comoutational Aooroaches to Semitic Languages (1998).*

ALA-LC Romanization Tables: Transliteration Schemes for Non-Roman Scripts (1997), Library of COngress.*

Pau, Charles, Globalizing Your E-Business, http://www-206.ibm.com/software/globalization/topics/bid/index.jsp website visited Oct. 31, 2004.

* cited by examiner m̄ m̄ m̄ m̄
FIG. 2A
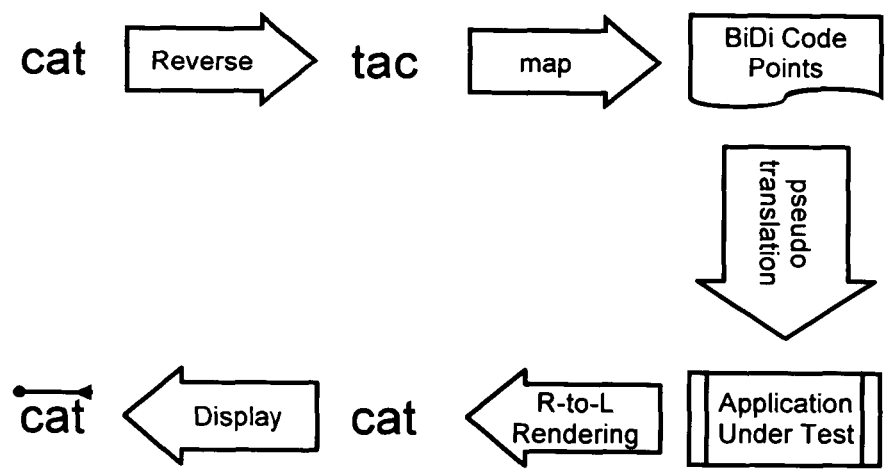
FIG. 2B
FIG. 2C

PRE-TRANSLATION TESTING OF BI-DIRECTIONAL LANGUAGE DISPLAY

BACKGROUND OF THE INVENTION

1. Statement of the Technical Field

The present invention relates to the internationalization of computer software, and more particularly, to testing bi-directional character display in an application under test.

2. Description of the Related Art

Internationalizing computer software can be difficult and expensive. Yet, the internationalization of computer software can be critical to ensure the global success of computer software. In this regard, it has been estimated that worldwide business-to-business e-commerce will have grown to $30 billion by the early 21st century, while at the same time non-English speakers will constitute more than 50 percent of the world's online population. With more than half of the world's Internet users predicted to be non-native English speakers in the near future, going global is not merely a business advantage in the 21st century; it is a business imperative.

In the past, the process of accommodating a specific country's language, conventions, and culture was done on a more or less ad hoc basis—essentially retrofitting software to accommodate a particular locale. Merely separating the text in a user interface from one's program is not an acceptable solution, however. Even after translating software prompts, help messages, and other textual information to the target languages, one still has to address basic issues of displaying and printing characters in the target language. Challenges can arise, however, in handling languages which incorporate bi-directional script.

Bi-directional language scripts refer to text which is written from right to left, and left to right, and may also incorporate embedded numbers or segments of text in Western scripts. Bidirectional scripts generally can be found in languages spoken by more than half a billion people in the Middle East, Central and South Asia and in Africa. Prominent among these languages are Arabic, Persian (Farsi), Hebrew, and Yiddish to name a few. Notably, languages that utilize Arabic script also include special ligature, diacritic and shaping features which add a level of complexity in the display and printing of the languages that do not apply to other European and Asian languages.

Unlike many other unidirectional languages, bi-directional Arabic text is cursive and characters are generally connected one to another so that they appear hand written, even when printed. In this regard, shape refers to the way a character is positioned relative to preceding and following characters. For instance, in the Arabic language, depending upon syntax, scripts can contain from one to four shapes for each character or ligature. The possible shapes for the Arabic character can include (1) Isolated: the character is not linked to either the preceding or the following character; (2) Final: the character is linked to the preceding character but not to the following one; (3) Initial: the character is linked to the following character but not to the preceding one; and (4) Middle: the character is linked to both the preceding and following characters. In a text string, the shaping rules that govern a character, its neighbors, and its position within a word determine its presentation shape.

As more companies deploy software products worldwide, software testing must change to verify software products developed for deployment in non-English environments. In order to test the translatability of a product, use is sometimes made of pseudo translations as described in U.S. Pat. No. 6,453,462 to Meade et al. Such pseudo translations however do not allow non-speakers of a bi-directional language to be able to test the special bi-directional script handling abilities of the product under test because the pseudo translation text is either static or not displayed in a true bidirectional environment which is needed to test the script handling.

A true test of bi-directional text handling requires actual bi-directional language data because bi-directional languages often include special forms of many characters as well as justification spacers known in the Arabic language as "kashidas". Existing techniques require non Arabic-literate testers to memorize the appearance of a standard bi-directional language text segment or compare actual text output with images of the identical text that is known to have been rendered correctly. The drawback of this approach is that it is very time consuming and the testers may not be able to detect text in the bi-directional language that is not quite correct and therefore not detect real defects. The standard text may not fit well into the user interface requiring additional standard test strings to be used. Accordingly, to detect errors in placement of a bi-directional script such as Arabic can require of the tester intense language skills not normally possessed by test staff. Of course, to do so can be expensive and restrictive as it often means that the most technically qualified staff may not possess the language proficiency necessary to properly test the application.

SUMMARY OF THE INVENTION

The present invention addresses the deficiencies of the art in respect to testing bi-directional language script and provides a novel and non-obvious method, system and apparatus for testing the display of bi-directional language script prior to translation in an application under test. In a particular aspect of the invention, a system for testing the display of bi-directional language script prior to translation in an application under test can include a unidirectional to right-to-left character code point mapping. Each unidirectional character in the mapping can have a corresponding right-to-left character code.

The system further can include a pseudo-translator configured to produce a pseudo-translation by reversing characters of an input string and mapping the reversed characters to right-to-left character code points according to the code point mapping. Importantly, a multiplicity of unidirectional language glyphs can be included. Each of the glyphs can correspond to a same one of the right-to-left character code points as had been used by the pseudo-translator to produce the pseudo-translation. In this way, a combination of the pseudo-translation and the glyphs when rendered by an application under test can simulate right-to-left character rendering in the application under test such that a resultant output is visually similar to the input string.

A method for testing the display of bi-directional language script prior to translation in an application under test can include using unidirectional glyphs with shaping indicators to simulate right-to-left characters. In particular, the method can include reversing an ordering of a first set of unidirectional text characters in an input string and mapping the unidirectional text characters to right-to-left code points in a bi-directional language code page to produce a pseudo-translated string. A multiplicity of unidirectional language glyphs can be loaded where each of the glyphs corresponds to a same one of the right-to-left character code points as had been used to produce the pseudo-translation. Finally, the pseudo-translation and the glyphs can be combined to simulate right-to-left character rendering in an application under test such that a resultant output is visually similar to the input string.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 2A is a pictorial illustration of a set of glyphs rendered with corresponding shaping indicia in accordance with the present invention;

FIG. 2B is a pictorial illustration of a process for forming a pseudo translation and the rendering of the pseudo translation using a mapped font that includes shaping indicia;

FIG. 2C is a pictorial illustration of a process of rendering of a pseudo translation using a mapped font that includes shaping indicia and accounting for the insertion of justification spacers; and, FIG. 3 is a flow chart illustrating a process for rendering a pre-translation testing of the display of bi-directional language script using mapped shaping indicia.

DETAILED DESCRIPTION OF THE PREFERRED EMBODIMENTS

The present invention is a method, system and apparatus for testing the display of bi-directional language script prior to translation in an application under test. In accordance with the present invention, a first set of unidirectional text characters in an input script can be reversed in order and mapped to code points in the bi-directional language code page producing a pseudo translation. A set of unidirectional glyphs can be associated with each right-to-left character code point to which a same unidirectional character was mapped. In addition, each glyph can have shaping indicia such that when rendered by the product under test, the shaping of the right-to-left character code point is evident.

It will be recognized by the skilled artisan that by producing either a pseudo-translation for text that appears in a user interface, or by modifying test data in the same fashion, an environment can be produced in which the storage of the text utilizes bi-directional language code points. As a result, normal text handling can be performed for the bi-directional language, for example right to left text direction, character shaping and the insertion of justification spacers. The resultant display further can be recognized by a tester who can read text based upon the unidirectional language even if the tester cannot read the bi-directional language.

It is an advantage of the present invention that no special bi-directional language reading skills are needed by the tester. As such, test staff resources can be applied with greater flexibility and staffing costs can be reduced. Yet, the software under test still can perform all of the required bi-directional language text rendering allowing a high level of confidence in the test effort and hence the stability of the code after translation. Moreover, special bi-directional language test strings need not be memorized and test data formed using the unidirectional language can be used whilst still retaining the ability of the tester to detect corruption. Finally, the shaping of characters in the bi-directional language can be determined to be correct by inspecting the character shaping indicia present in each glyph and the insertion of justification spacers will not prevent the confirmation of shaping behavior.

Figure 1:
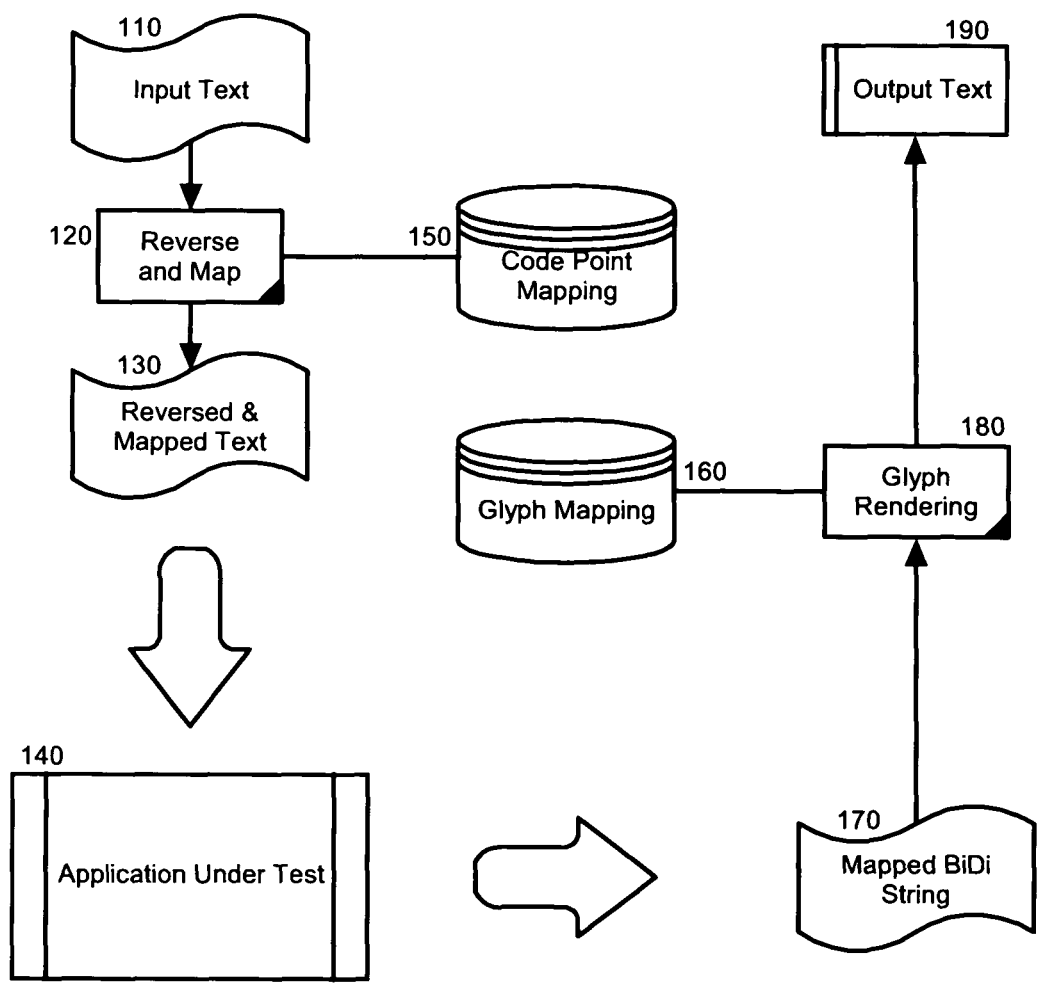
FIG. 1 is a schematic illustration of a system for testing the display of bi-directional language script prior to translation in an application under test.

In further illustration of the foregoing inventive arrangements, FIG. 1 is a schematic illustration of a system for testing the display of bi-directional language script prior to translation in an application under test 140. The system can include a code point mapping 150 coupled to text reversal and mapping logic 120. The code point mapping 150 can be used to map the original unidirectional text characters 110 to right-to-left language code points 130. The code point mapping 150 can be fundamentally arbitrary as the translation process is merely a pseudo-translation process to occur prior to any actual translation from the unidirectional language to the bi-directional language. An exemplary mapping of Latin script to Arabic script can include:

| | | |
|---|---|---|
| U+0025 | => | U+066A (Percent) |
| U+002C | => | U+060C (Comma) |
| U+0030 through U+0039 | => | U+0660 through U+0669 (0–9) |
| U+003B | => | U+061B (Semicolon) |
| U+003F | => | U+061F (Question mark) |
| U+0041 through U+005A | => | U+0621 through U+063A (A–Z) |
| U+0061 through U+006A | => | U+0641 through U+064A (a–j) |
| U+006B through U+0070 | => | U+0671 through U+0676 (k–p) |
| U+0071 through U+007A | => | U+0681 through U+068A (q–z) |

Notably, in the exemplary case, no Latin character is be mapped to the code point U+0640 which is the "tatweel" or "kashida" which can be inserted by the rendering software as needed.

The system also includes a glyph mapping 160 manifested as a font 180. The glyph mapping 160 can include a set of unidirectional language based glyphs associated with corresponding right-to-left code points. The mapping for the glyph mapping 160 must be the same mapping as that of the code point mapping 150. In this way, when a mapped bi-directional string 170 is rendered using the font 180, the visual appearance of the output 190 will appear legible to one who understands only the unidirectional language because the right-to-left ordering of the mapped glyphs will correspond to the reversal of the unidirectional input text 110. In addition to the mirroring of the mapping of code point mapping 150, the font 180 also can include a glyph for the kashida character. Advantageously, the font 180 can accommodate screen and or print rendering.

Notably, some letters in a bi-directional language such as Arabic can have multiple glyphs, depending on whether the letter is isolated, initial, middle or final. Consequently, in addition to reversing the mapping for the glyphs, a shaping indicator can be added to each glyph. The shaping indicia can include an additional overbar or underscore which indicates to the tester that the glyphs are representative of right-to-left codepoints as well as the shaping for the bi-directional text.

In a preferred aspect of the invention, the indicia can be marked to denote the four forms as shown in FIG. 2A. Specifically, the four forms can include "isolated", "initial", "middle" and "final" corresponding to the shaping possibilities in the Arabic language. By reference to the shaping indicia, the tester will recognize a proper shaping for the right-to-left characters in the pseudo-translation, even though the tester may not understand the bi-directional language of the characters.

In more specific illustration, FIG. 2B is a pictorial illustration of a process for forming a pre-translation rendering of unidirectional language script using mapped shaping indicia. Initially, the initial text having unidirectional language based characters can be reversed in order and mapped to left-to-right language code points. Each character of the mapped bi-directional language code points can be further mapped to a corresponding shape indicia and also a unidirectional glyph. Finally, both the unidirectional glyph and the shape indicia can be rendered to produce a pseudo-translation of the bi-directional language equivalent to the unidirectional input text which will be understood by one who cannot understand the bi-directional language.

It will be recognized by the skilled artisan that a tester viewing the rendering of the unidirectional glyphs in combination with the shaping indicia can detect improper shaping errors based upon an understanding of the symbology of the shaping indicia and not the bi-directional language. Moreover, detecting these types of errors do not require a knowledge of the bi-directional language or its character shaping. Consequently, testing personnel can be assigned the testing task based principally upon technical proficiency and not language proficiency.

It is an advantage of the present invention that the use of justification spacers such as Arabic kashidas can be accommodated. In this regard, FIG. 2C is a pictorial illustration of a process for forming a pre-translation rendering of bi-directional language script using mapped shaping indicia and accounting for the insertion of justification spacers. In particular, the shape indication of justification spacers can be made such that there is a small space in the indicator bar or a small vertical line if it is desired to be able to detect if justification spacers have been inserted. It will be understood, though, that the form of the indicator is however not limited to the illustrated examples.

Figure 3:
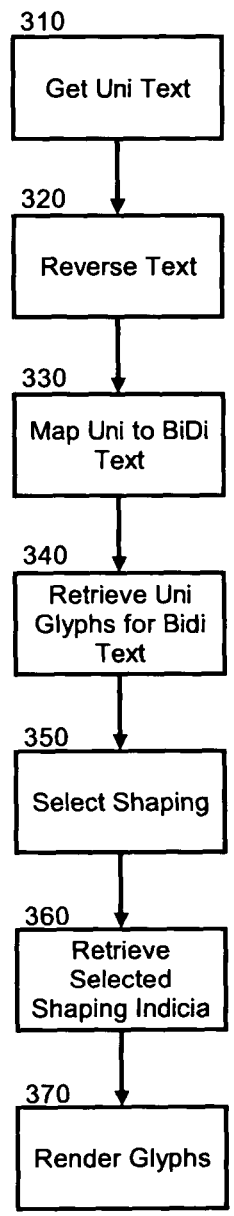

In summary, FIG. 3 is a flow chart illustrating a process for rendering a pre-translation display of bi-directional language script using mapped shaping indicia. Beginning in block 310, unidirectional text can be loaded for processing and the characters of the unidirectional text can be reversed in block 320. In block 330, each of the characters can be mapped to a right-to-left code point in a bi-directional language thus producing a pseudo translation 340 for a bi-directional language. In block 350, the application under test, applies its rendering logic to the pseudo translation in the normal manner. Finally, in block 360 the output of the application under test is displayed using the special font that contains unidirectional glyphs in right-to-left code point positions as well as shaping indicators for each of the four possible shapes Finally, in block 370, the unidirectional glyphs and shaping indicia can be rendered for viewing by the tester.

Several advantages can be achieved through the operation of the present invention. First, by reversing the character order of a unidirectional language string, text can be detected which has not been properly reversed at display time. Moreover, the bi-directional rendering of the unidirectional text can appear to in the same order as the original unidirectional text. Second, by mapping the unidirectional text to right-to-left code points, the application under test can handle actual bi-directional code points including the use of justification spacers and shaping. Finally, the use of shape indicators allows the detection of incorrect shaping and also the use of shape indicators allows differentiation between right-to-left code points and unidirectional code points.

The present invention can be applied to pseudo translations as well as test data that can be entered and stored wherever text could normally be entered. A tool to produce pseudo translations for bi-directional languages such as Arabic or Hebrew can convert the original text resources that appear in the user interface, and store them as a translation so that the product under test follows the expected code paths that would be followed if actual bi-directional language translations were present. Such pseudo translations are not limited to any particular programming language or environment so long as the font having the glyph mappings is available on the device that renders the translated text and the font can be set as the font to be used. If the computing environment does not allow font selection, the font can replace the font that is normally used in order to carry out the testing.

Test data similarly can be generated and stored in the same way that any other bi-directional text is stored. Since the characters are true bi-directional language code points, test data can be copied and pasted and indeed edited just like any other text because it is in fact such text. Rather, the pasting simply displays in a form that is legible in other languages because of the special display font. It can therefore also be used to test editing and other such operations that are expected to be performed on bi-directional language text.

Finally, test data can be inserted directly from the keyboard by employing a keyboard driver that uses the same mapping of unidirectional code point to right to left code points as the display font. In other words, using the example mapping described herein, the keyboard can be configured so that when a specified key has been depressed, the key can produce the right-to-left character represented by a Unicode code point. The bi-directional character will be stored as a normal bi-directional code point. The disadvantage is that the person would have to type in palindromes or backwards to produce text that makes sense. Alternatively, the keyboard driver can be contrived to work like an Input Method Editor in which one types the entire string and then a special keystroke to signal the end of the string at which time the order reversal and mapping is performed on the entire string and sent to the application as bi-directional language text.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for testing the display of bi-directional language script prior to translation in an application under test, the method comprising the steps of:
    using unidirectional glyphs with shaping indicators selected from the group consisting of an overbar and an underscore, to simulate right-to-left characters, the shaping indicators each indicating a shaping of a corresponding right-to-left character code point; and,
    displaying the characters each with a corresponding one of the shaping indicators placed over a corresponding one of the characters in a display of a computer;
    wherein the using step comprises the steps of:
    reversing an ordering of a first set of unidirectional text characters in an input string;
    mapping said unidirectional text characters of said input string in said reversed order to corresponding right-to-left code points in a bi-directional language code page, the mapping producing a pseudo-translated string;
    loading a plurality of unidirectional language glyphs, each of said glyphs corresponding to a same one of said right-to-left character code points as had been used to produce said pseudo-translated string; and,
    combining said pseudo-translated string and said glyphs to simulate right-to-left character rendering in an application under test such that a resultant output is visually similar to said input string.

2. The method of claim 1, further comprising the steps of:
    selecting shaping indicia for said bi-directional code points; and,
    coordinating a combination of said selected shaping indicia with said unidirectional glyphs to produce output that allows detection of shaping errors.

3. The method of claim 2, further comprising the step of accounting for justification spacers when performing said selecting and coordinating steps.

4. The method of claim 1, further comprising the step of selecting unidirectional glyphs for corresponding unidirectional text characters embedded among said bi-directional code points.

5. The method of claim 2, wherein said unidirectional text characters are Latin text characters.

6. The method of claim 5, wherein said bi-directional code points are Arabic code points.

7. The method of claim 5, wherein said bi-directional code points are Hebrew code points.

8. The method of claim 6, wherein said justification spacers are Arabic kashidas.

* * * * *